Figure 2:
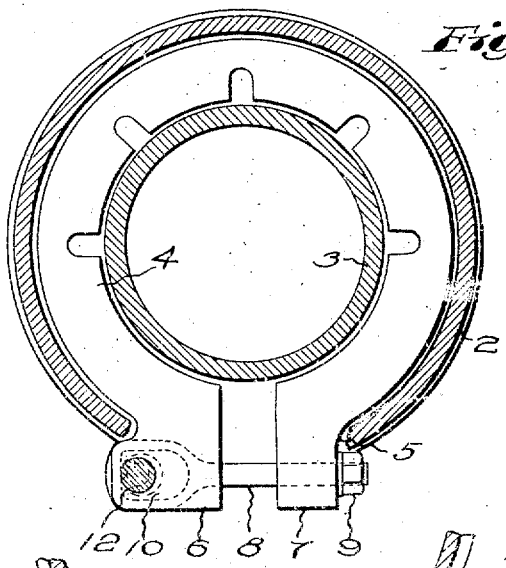

W. T. SEARS.

CLAMPING MECHANISM.

APPLICATION FILED SEPT. 12, 1916.

Reissued Feb. 20, 1917.

14,263.

2 SHEETS—SHEET 1.

INVENTOR

Willard T. Sears

BY S. Jay Teller

ATTORNEY

W. T. SEARS.
CLAMPING MECHANISM.
APPLICATION FILED SEPT. 12, 1916.
Reissued Feb. 20, 1917.
14,263.
2 SHEETS—SHEET 2.
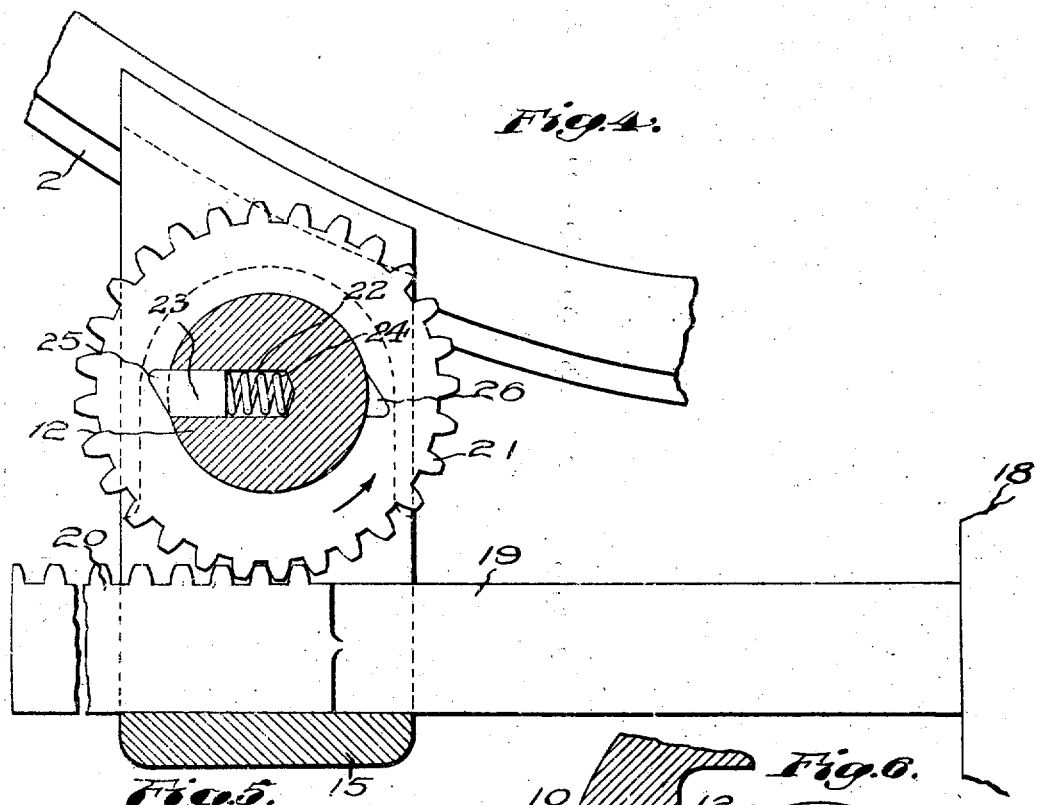
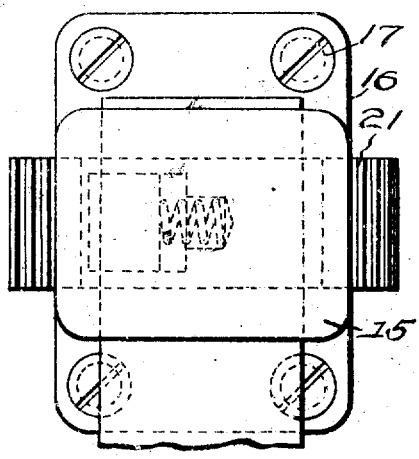
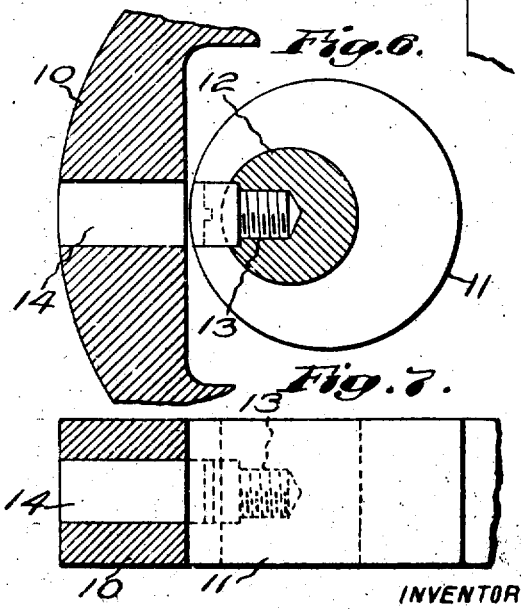
INVENTOR
Willard T. Sears
BY S. Jay Tebbler
ATTORNEY

UNITED STATES PATENT OFFICE.

WILLARD T. SEARS, OF PHILADELPHIA, PENNSYLVANIA, ASSIGNOR TO NILES-BEMENT-POND COMPANY, OF JERSEY CITY, NEW JERSEY, A CORPORATION OF NEW JERSEY.

CLAMPING MECHANISM.

14,263. Specification of Reissued Letters Patent. Reissued Feb. 20, 1917.

Original No. 1,185,839, dated June 6, 1916, Serial No. 860,183, filed September 4, 1914. Application for reissue filed September 12, 1916. Serial No. 119,771.

*To all whom it may concern:*

Be it known that I, WILLARD T. SEARS, a citizen of the United States, residing at Philadelphia, in the county of Philadelphia and State of Pennsylvania, have invented certain new and useful Improvements in Clamping Mechanism, of which the following is a specification.

This invention relates to clamping mechanism, among the objects of the invention being the provision of means of the character noted which is simple in construction, effective in action, and easy to control.

Clamping mechanism involving my invention can be employed with advantage in any connection where a device of this character is necessary, although it is of particular utility when incorporated in a radial drill involving a rotary column. In this particular field it is adapted to be utilized for holding the column or equivalent member in a rotatively adjusted position, or at least holding the column sufficiently to make accidental movement thereof practically an impossibility.

In the drawings accompanying and forming part of the present specification I have shown in detail one of the several convenient forms of embodiment of the invention, which to enable those skilled in the art to practice the same will be set forth fully in the following description. I do not restrict myself to this particular disclosure; I may depart therefrom in several respects within the scope of the invention defined by the claims following said description.

Figure 3:
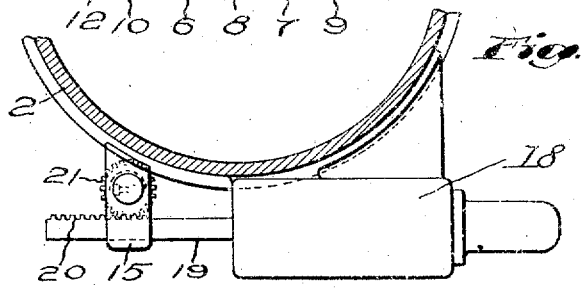
Figure 1:
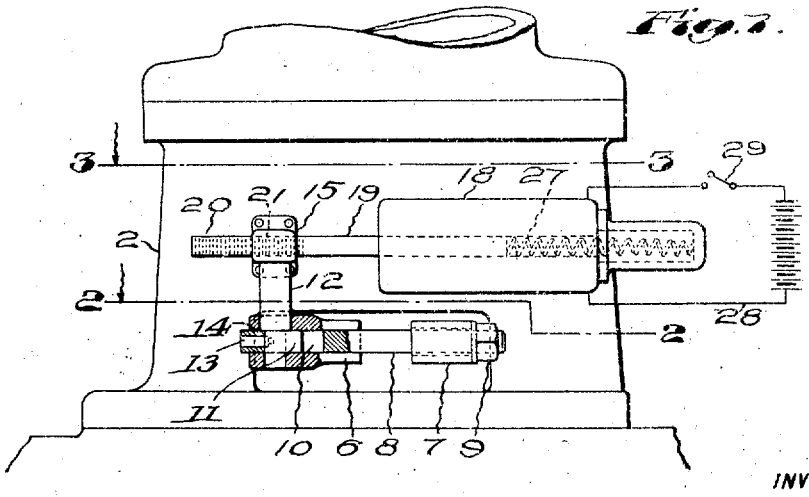

Referring to said drawings: Figure 1 is a front elevation partly in section, of a portion of a radial drill, equipped with clamping mechanism involving my invention. Fig. 2 is a horizontal section on the line 2—2 of Fig. 1. Fig. 3 is a similar section on the line 3—3 of said Fig. 1, only the parts, however, at the front appearing. Fig. 4 is a sectional top plan view of part of the base and solenoid with rack and pinion and shaft, clutch device between the shaft and pinion and certain coöperating devices. Fig. 5 is a front elevation of the supporting bracket, the pinion and clutch. Fig. 6 is a horizontal section through the lower end of the shaft, the loop, (partly shown) being in section, while the eccentric is in full lines. Fig. 7 is a vertical section of the parts shown in Fig. 6.

Like characters refer to like parts throughout the several views, some of which are on exaggerated scales.

As I have already observed clamping mechanism involving my invention can be employed in many different ways. In the drawings I have shown the base or bed 2 and the column 3 of a radial drill which may for example be like the corresponding parts shown in Letters Patent 1,089,442 granted to me March 10, 1914. This column 3 is supported for rotary adjustment by the base or bed 2, ordinarily having a depending portion turnable within the base which is usually made hollow. Preferably within the hollow bed or base 2 is mounted a suitable clamping device such for instance as the ring 4 (shown as split or divided), the base or bed having a slot 5 through which ears or lugs as 6 and 7 at the terminals of the ring, extend. When this clamping ring is constricted about the rotary column, the latter will be held, whereas by opening the ring, the column will be released and can be turned to effect adjustments about an axis. The ear 7 is shown as having a hole or perforation for the passage of the bolt 8 provided at one end with a suitable abutment such as the nut 9, and at the other with a loop 10, the ear or lug 6 being slotted or apertured to receive for free movement said loop 10. As shown the abutment or nut 9 bears against the outer face of the ear or lug 7. It, therefore, follows that if the bolt 8 be drawn toward the left in Fig. 2, the lug 7 through the nut 9, will be moved in a corresponding direction thereby to set the clamping ring 4 or cause it to closely hug the column 3 to maintain the latter in an adjusted position. When the bolt or equivalent element 8 is freed from the pull or stress, the ring 4 will be free to open by expansion. To operate the bolt 8 I may, as shown provide an eccentric or cam 11 connected rigidly with the shaft 12 in some suitable manner as by the screw 13, the outer branch of the loop 10 having an opening or hole 14 to facilitate assemblage of the parts in that the eccentric can be applied to the shaft as the latter is passed through the loop 10 depthwise thereof, after which the eccentric can be fastened in place by the screw 13 adapted to be passed through the opening 14. The shaft 12 as shown, is stepped at its lower end in the lug or ear 6 which latter as will be obvious is fixed relatively to the opposite lug or ear 7, the upper end of said shaft 12 extending through a bracket 15 of practically loop form provided at its inner end with a flange 16 fastened by one or more screws as 17, to the outer surface of the bed 2. It will be evident, therefore, that the shaft 12 in the present instance, is susceptible solely of rotary movement, the construction being such that said shaft on each intermittent operation thereof is given a half turn; also said shaft always turns in the same direction.

In Fig. 6 the eccentric 11 is in its retracted position, the clamping ring or band 4 at this time being unset or open. It will be observed that at this time, the low part of the eccentric is against the outer cross bar of the loop 10. On the movement or half turn of the shaft 12 in the manner described, the eccentric 11 rotative therewith, will by acting against the loop 10, thrust the bolt 8 to the left in Fig. 2, thus clamping the ring in the manner already described, the maximum movement being completed when the highest part of the eccentric is against the outer cross bar of the loop 10 at which point the shaft 12 will have completed a half turn, and as will be understood the ring 4 will be tight. On the return of the eccentric 11 to its initial position during another half movement of the shaft 12 said eccentric will be moved until its low part is again brought toward the loop on the outer cross bar 10, and on such movement of the eccentric, the bolt 8 is permitted to react and the ring 4 to expand. The foregoing is a description of one simple means of operating a clamping device such as a ring and is, I might state, highly advantageous. The eccentric 11 always moves in the same direction, intermittently, however, being adapted to successively set and unset the clamping ring. This eccentric or equivalent device is preferably electrically operated, and for this purpose a suitable actuating device as the solenoid 18 may be provided, said solenoid being supported rigidly upon the base or bed 2. The core 19 of the solenoid as shown is continued to form the rack 20, the teeth of which mesh with the pinion 21 loose on but adapted to be clutched suitably to the shaft 12, for instance, by a pin clutch, the pinion 21 and the rack 20 being mounted in the hollow bracket 15. That part of the shaft 12 which is surrounded by the pinion 21 has a radial opening or socket 22 to receive the pin 23 constantly urged forward by the coiled spring 24, the wedge end of the pin or plunger 23 being adapted to alternately enter the beveled notches 25 and 26 formed diametrically opposite each other in the wall of the opening of the pinion 21. In Fig. 4 the plunger or pin 23 is occupying the notch 25, the ring 4 being assumed to be unset, the solenoid 18 deënergized and the core 19 in its extreme forward position where it is normally held by the coiled spring 27. The solenoid 18 as shown is included in the circuit 28 having a push button or switch 29. It will be assumed that the solenoid 18 is energized by pressing the button 29. On this action said solenoid draws in its core 19 or moves the same toward the right in Figs. 1, 3 and 4, thus turning the pinion 21 and hence the shaft 12 in the direction of the arrows applied respectively thereto in Fig. 4. The shaft as I have observed is given a half turn on each energization of the solenoid 18, the consequence being that the eccentric 11 is operated to move the loop 10 outward in the manner previously described. When the solenoid is deënergized by breaking the circuit 28, the spring 27 returns the solenoid 18 and through the rack 20 the pinion 21 to their original positions, the notch 26 being brought opposite the pin 23 on the backward movement of the pinion 21 without, however, transmitting motion to the shaft and therefore not affecting the shifted position of the eccentric. When the bevel notch 26 is opposite the plunger or pin 23, the latter is shot into the former by the power of the spring 24. It, therefore, follows that when the solenoid 18 is again energized and the pinion 21 is turned, the shaft 12 will, through the clutch, be given a half turn to effect in the manner already described, the release of the ring 4 and hence of the column or upright which it grips.

It will be noted that in the organization shown the cam element or eccentric 11 always moves in the same direction, being given intermittent or successive movements through suitable means such as the solenoid described to cause the successive setting and unsetting of the clamping device of whatever character the same may be. While the clamping device is shown in the form of a resilient ring, this is not a matter of consequence as it might be of some radically different type. As a matter of fact, the invention, as I have practically already observed, is not restricted to any detail, but I have shown one highly advantageous arrangement.

When I speak of a clamping device I do not use the designation in a restricted but in a broad sense. It is evident that it is not essential that this clamping device should grip an object whether it be a column or not, the elemental consideration being that the clamping device when in operative relation should check or make hard the movement of a movable part, the clamping device, therefore, being in the nature of a checking or movement-retarding element.

In this specification the construction and mode of operation of the mechanism shown in the drawings has been set forth quite fully and with considerable particularity in order that one embodiment of the invention may be clearly understood. However, the construction shown and described has been selected for illustrative purpose only, as the invention can be embodied in any of a number of ways, and it will be understood that the foregoing description is not intended to define or limit the scope of the invention, the appended claims being relied upon for that purpose.

One of the important features of my invention is the combination of parts which enables a power transmitting or translating device, preferably an electromagnetic means, by one movement or energization to act positively to set the clamp and then by another preferably similar movement or energization to act positively to cause the release of the clamp. Another important feature of the invention is a controlling device, such as a switch, so constructed and connected that one movement will cause the clamp to be set and another similar movement will cause the clamp to be released. This is to be contrasted with earlier devices with which one movement was necessary to effect setting and another entirely different movement to effect releasing. The clamp and the operating device therefor are particularly well adapted for use in conjunction with the parts of a radial drill as shown, and one of the advantages incident to such use is that the controlling means for the operating device, in this case the switch, is mechanically independent of the said device, and can be positioned more or less remotely therefrom as found convenient.

What I claim is:

1. The combination of a clamping device, means always movable in the same direction, for causing the setting of the clamping device during one part of said movement and for causing the unsetting of the clamping device during another part of said movement, and a solenoid acting against said means to impart thereto said successive movements.

2. The combination of a base, a column extending into and rotative with respect to said base, a clamping device for the column, in said base, means supported by the base, always movable in the same direction, for causing the setting of the clamping device during one part of the movement of said means and for causing the unsetting of the clamping device during another part of said movement, and a solenoid on said column for successively operating said means on successive energizations of said solenoid.

3. The combination of a clamping device, a rotary cam element always movable in the same direction, means for transferring the effect of the cam element to the clamping device, the active portion of the cam element being shaped to cause through said means the setting of the clamping device on a forward half turn of the cam element and to cause the unsetting of the clamping device on the remaining half turn of said cam element, and a solenoid for imparting on successive energizations thereof successive half turns to said cam element.

4. The combination of a rotary shaft, a gear member loose on said shaft, means for oppositely rotating the gear member, means for imparting to said shaft a half turn on the forward movement of said gear member and for preventing movement of the shaft on return movement of said gear member, a cam connected with said shaft, a clamping device, and means actuated by the cam for causing the setting of said clamping device on forward movement of the cam and for unsetting the clamping device on a second forward movement of the cam in the same direction.

5. The combination of a clamping device, rotary means always movable in the same direction, for causing the setting of the clamping device during one half of the rotary movement and for causing the unsetting of the clamping device during the other half of said rotary movement, and a solenoid acting against said means to impart intermittently thereto said movements.

6. The combination of a rotary shaft, a pinion loose on said shaft, a solenoid, the core of which is provided with teeth in mesh with said pinion, said solenoid when energized being adapted through said toothed gear to forwardly rotate the pinion, means for oppositely rotating said pinion, means for imparting to said shaft a half turn on the forward movement of the pinion and for preventing movement of the shaft on return movement of said pinion, a cam connected with said shaft, a clamping device, and means actuated by the cam for causing the setting of the clamping device on forward movement of the cam and for unsetting the clamping device on a second forward movement of the cam in the same direction.

7. The combination of a rotary column, a clamping device for said column, a solenoid, and means actuated by said solenoid, and always movable in the same direction, for causing the setting of the clamping device during one part of the movement of said means, and for causing the unsetting of the clamping device during another part of the movement of said means.

8. The combination with the base and the column rotatably mounted thereon, of a clamp adapted to lock the column against rotative movement, a device for setting and releasing the clamp, and a controlling means for the said device mechanically independent thereof and adapted upon movement to cause the clamp to be set and upon a subsequent similar movement to cause the clamp to be released.

9. The combination with the base and the column rotatably mounted thereon, of a clamp adapted to lock the column against rotative movement, a device for setting and releasing the clamp, a controlling means for the said device having an operative and an inoperative position, and means whereby a movement of the said controlling means from inoperative to operative position causes the clamp to be set and whereby a subsequent similar movement from inoperative to operative position causes the clamp to be released.

10. The combination with the base and the column rotatably mounted thereon, of a clamp adapted to lock the column against relative movement, an operating device for the clamp adapted at one actuation to apply power to set the clamp and at the next similar actuation to apply power to release it, and a controlling means for effecting the actuation of the operating device.

11. The combination with the base and the column rotatably mounted thereon, of a clamp adapted to lock the column against rotative movement, a solenoid for operating the clamp, means whereby the solenoid upon successive energizations alternately sets and releases the clamp, and a manually operable switch remote from the solenoid and serving when closed to cause the energization thereof.

12. The combination of a clamp, an operating element for the clamp, means for reciprocating the said element through a fixed cycle, and means whereby the said element sets the clamp at one movement and releases it at a subsequent movement in the same direction.

13. The combination of a clamp, an operating element for the clamp, means for reciprocating the said element through a fixed cycle, and means whereby the said element alternately sets and releases the clamp at successive movements in the same direction.

14. The combination of a clamp, a reciprocable operating element for the clamp movable in one direction upon the application of power and automatically movable in the other direction upon being released, and means whereby the said element sets the clamp at one power stroke and releases it at another power stroke in the same direction.

15. The combination of a clamp, electromagnetic operating means for the clamp, and means for energizing the electromagnetic means to cause it to apply power to cause the setting of the clamp and then apply power to cause the release thereof.

16. The combination of a clamp, a solenoid having a core movable in one direction upon the energization of the solenoid and automatically movable in the other direction upon the deënergization thereof, and means whereby the said core alternately sets and releases the clamp upon successive movements in the first said direction.

In testimony whereof, I hereto affix my signature.

WILLARD T. SEARS.